United States Patent

Tanuma

(10) Patent No.: US 7,157,176 B2
(45) Date of Patent: Jan. 2, 2007

(54) MEMBRANE-ELECTRODE ASSEMBLY FOR POLYMER ELECTROLYTE FUEL CELL, AND PROCESS FOR ITS PRODUCTION

(75) Inventor: Toshihiro Tanuma, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 11/315,016

(22) Filed: Dec. 23, 2005

(65) Prior Publication Data

US 2006/0105232 A1 May 18, 2006

Related U.S. Application Data

(63) Continuation of application No. PCT/JP04/08889, filed on Jun. 24, 2004.

(30) Foreign Application Priority Data

Jun. 24, 2003 (JP) ............................. 2003-179783
Aug. 26, 2003 (JP) ............................. 2003-301226

(51) Int. Cl.
*H01M 4/04* (2006.01)
(52) U.S. Cl. ..................... 429/42; 429/40; 502/101; 427/115
(58) Field of Classification Search ................. 429/40, 429/42; 502/101; 427/115
See application file for complete search history.

(56) References Cited

U.S. PATENT DOCUMENTS 5,472,799 A 12/1995 Watanabe
5,800,938 A 9/1998 Watanabe
2002/0144394 A1* 10/2002 Uchida et al. ............. 29/623.5
2005/0143540 A1 6/2005 Terada et al.

FOREIGN PATENT DOCUMENTS

| JP | 6-103992 | 4/1994 |
| JP | 6-196173 | 7/1994 |
| JP | 6-196174 | 7/1994 |
| JP | 7-134995 | 5/1995 |
| JP | 2001-118591 | 4/2001 |
| JP | 2001-357857 | 12/2001 |
| JP | 2002-289208 | * 10/2002 |

* cited by examiner

*Primary Examiner*—Raymond Alejandro
*Assistant Examiner*—Tony Chuo
(74) *Attorney, Agent, or Firm*—Oblon, Spivak, McClelland, Maier & Neustadt, P.C.

(57) ABSTRACT

A process for producing a membrane-electrode assembly for a polymer electrolyte fuel cell comprising an anode and a cathode each having a catalyst layer, and an ion exchange membrane disposed between them, and the membrane-electrode assembly so produced, wherein at least one of the catalyst layers is produced by preparing a coating fluid containing an ion exchange polymer and a catalyst having catalytic metal particles dispersed on a carbon support, and a catalyst layer is formed by applying the coating fluid on a substrate, wherein the catalyst has a density of total functional groups of OH groups and CO groups at the surface is at most $1.6 \times 10^{-3}$ (mmol/m$^2$), as obtained from the BET specific surface area and the total molar amount of OH groups and CO groups at the surface obtained by a titration method.

16 Claims, 1 Drawing Sheet

MEMBRANE-ELECTRODE ASSEMBLY FOR POLYMER ELECTROLYTE FUEL CELL, AND PROCESS FOR ITS PRODUCTION

TECHNICAL FIELD

The present invention relates to a process for producing a membrane-electrode assembly for a polymer electrolyte fuel cell, whereby the initial output voltage is high, and the high output voltage can be obtained over a long period of time.

BACKGROUND ART

A fuel cell is an electric cell whereby a reaction energy of a gas as a feed material is converted directly to electric energy, and a hydrogen-oxygen fuel cell presents no substantial effect to the global environment since its reaction product is only water in principle. Especially, a polymer electrolyte fuel cell employing a polymer membrane as an electrolyte, can be operated at room temperature to provide a high power density, as a polymer electrolyte membrane having high ion conductivity has been developed, and thus is expected to be a prospective power source for mobile vehicles such as electric cars or for small cogeneration systems, along with an increasing social demand for an energy or global environmental problem in recent years.

In a polymer electrolyte fuel cell, a proton conductive ion exchange membrane is commonly employed as a polymer electrolyte, and an ion exchange membrane made of a perfluorocarbon polymer having sulfonic acid groups, is particularly excellent in the basic properties. In the polymer electrolyte fuel cell, gas diffusion type electrode layers are disposed on both sides of the ion exchange membrane, and power generation is carried out by supplying a gas containing hydrogen as a fuel and a gas (such as air) containing oxygen as an oxidizing agent to the anode and the cathode, respectively.

In the reduction reaction of oxygen at the cathode of the polymer electrolyte fuel cell, the reaction proceeds via hydrogen peroxide ($H_2O_2$), and it is worried that the electrolyte membrane may be deteriorated by the hydrogen peroxide or peroxide radicals to be formed in the catalyst layer. Further, to the anode, oxygen molecules will come from the cathode through the membrane, and it is conceivable that at the anode, hydrogen molecules and oxygen molecules will undergo a reaction to form radicals. Especially when a hydrocarbon membrane is used as the polymer electrolyte membrane, it is poor in the stability against radicals, which used to be a serious problem in an operation for a long period of time. For example, the first practical use of a polymer electrolyte fuel cell was when it was adopted as a power source for a Gemini space ship in U.S.A., and at that time, a membrane having a styrene/divinylbenzene polymer sulfonated, was used as an electrolyte membrane, but it had a problem in the durability over a long period of time.

As opposed to such a hydrocarbon type polymer, a perfluorocarbon polymer having sulfonic acid groups has attracted attention as a polymer excellent in the stability against radicals, and an ion exchange membrane made of such a polymer is known to be useful as an electrolyte membrane. And, in order to further increase the stability against radicals, a system having a compound with a phenolic hydroxyl group or a transition metal oxide capable of catalytically decomposing peroxide radicals incorporated to the polymer electrolyte membrane (JP-A-2001-118591) or a technique of supporting catalytic metal particles in the polymer electrolyte membrane to decompose hydrogen peroxide (JP-A-06-103992) is also disclosed. However, such a technique is a technique of incorporating a material only to the polymer electrolyte membrane, and is not one attempted to improve the catalyst layer as the source for generating hydrogen peroxide or peroxide radicals. Accordingly, although at the initial stage, the effect for improvement was observed, there was a possibility that a serious problem would result in the durability over a long period of time. Further, there was a problem that the cost tended to be high.

DISCLOSURE OF THE INVENTION

Object to be Accomplished by the Invention

In recent years, a polymer electrolyte fuel cell is expected as a power source for e.g. automobiles or housing markets, and a demand for its practical use is increasing, and its developments are accelerated. In such applications, its operation with high efficiency is required. Accordingly, its operation at a higher voltage is desired, and at the same time, it is desired that a constant output can be obtained over a long period of time. Further, in order to secure electroconductivity of the electrolyte membrane, it is required to humidify the electrolyte membrane, but from the viewpoint of the efficiency of the entire fuel cell system, an operation under low or no humidification is required in many cases.

Accordingly, for the practical application of a polymer electrolyte fuel cell to e.g. vehicles or housing markets, it is an object of the present invention to provide a membrane-electrode assembly for a polymer electrolyte fuel cell (comprising electrodes having catalyst layers, and a polymer electrolyte membrane), whereby power generation with sufficiently high energy efficiency is possible and at the same time, excellent durability can be obtained over a long period of time. For this purpose, it is an object of the present invention to provide a process for producing a membrane-electrode assembly having catalyst layers which scarcely generate hydrogen peroxide or peroxide radicals during the power generation.

Further, it is an object of the present invention to provide a membrane-electrode assembly for a polymer electrolyte fuel cell, which has a high power generation performance and whereby constant power generation is possible over a long period of time, either in its operation under low or no humidification where the humidification temperature (dew point) of the feed gas is lower than the cell temperature or in its operation under high humidification where humidification is carried out at a temperature close to the cell temperature.

Means to Accomplish the Objects

The present invention provides a process for producing a membrane-electrode assembly for a polymer electrolyte fuel cell comprising an anode and a cathode each having a catalyst layer, and an ion exchange membrane disposed between the anode and the cathode, characterized in that a step of producing at least one of the catalyst layer of the anode and the catalyst layer of the cathode, comprises a step of preparing a coating fluid containing an ion exchange polymer and a catalyst having catalytic metal particles dispersed on a carbon support, and a step of forming a catalyst layer by applying the coating fluid on a substrate, wherein the above coating fluid is prepared by using, as the above catalyst, a catalyst wherein the density of total functional groups of OH groups and CO groups at the surface is at most $1.6 \times 10^{-3}$ (mmol/m$^2$), as obtained from the BET specific surface area and the total molar amount of OH groups and CO groups at the surface obtained by a titration method.

Further, the present invention provides a process for producing a membrane-electrode assembly for a polymer electrolyte fuel cell comprising an anode and a cathode each having a catalyst layer, and an ion exchange membrane disposed between the anode and the cathode, characterized in that in a step of producing at least one of the catalyst layer of the anode and the catalyst layer of the cathode, after a step of preparing a coating fluid containing an ion exchange polymer and a catalyst having catalytic metal particles dispersed on a carbon support and a step of forming a catalyst layer by applying the coating fluid on a substrate, surface treatment to reduce the amount of OH groups and CO groups at the surface of the catalyst, is carried out, so that the density of total functional groups of OH groups and CO groups at the surface be brought to at most $1.6 \times 10^{-3}$ (mmol/m$^2$), as obtained from the BET specific surface area and the total molar amount of OH groups and CO groups at the surface of the catalyst obtained by a titration method.

Further, the present invention provides a process for producing a membrane-electrode assembly for a polymer electrolyte fuel cell, which comprises preparing a coating fluid containing an ion exchange resin and a catalyst having catalytic metal particles dispersed on a carbon support, forming a catalyst layer by applying the coating fluid on a substrate, using the obtained catalyst layer as a catalyst layer for each of an anode and a cathode, and disposing the catalyst layer of the anode and the catalyst layer of the cathode to face each other with an ion exchange membrane interposed therebetween, characterized in that in a step of producing at least one of the catalyst layer of the anode and the catalyst layer of the cathode, a step of applying surface treatment to the above catalyst so that the total molar amount of OH groups and CO groups at the surface of the catalyst is brought to one half of the initial value, is included, and the average particle size of the above catalytic metal particles contained in the catalyst layer is from 1 to 60 nm.

Further, the present invention provides a membrane-electrode assembly for a polymer electrolyte fuel cell comprising an anode and a cathode each having a catalyst layer, and an ion exchange membrane disposed between the anode and the cathode, characterized in that at least one of the catalyst layer of the anode and the catalyst layer of the cathode contains an ion exchange polymer and a catalyst having catalytic metal particles dispersed on a carbon support, and the above catalyst is such that the density of total functional groups of OH groups and CO groups at the surface is at most $1.6 \times 10^{-3}$ (mmol/m$^2$) as obtained from the BET specific surface area and the total molar amount of OH groups and CO groups at the surface obtained by a titration method.

If the amount of acidic functional groups, such as CO groups such as carboxyl groups, or OH groups such as phenolic hydroxyl groups, per unit area at the surface of the catalyst, particularly the carbon support, is large, the catalytic activities at the surface of the catalyst may be high, but a fuel cell having a membrane-electrode assembly containing such a catalyst incorporated, is considered to have a drawback such that during the power generation, hydrogen peroxide or peroxide radicals are likely to be formed, and the output is likely to decrease when the power generation is carried out for a long period of time. Whereas, in the process of the present invention, the membrane-electrode assembly is prepared by using a catalyst having a small amount of acidic functional groups at the surface of the catalyst having catalytic metal particles dispersed on a carbon support or the carbon support with dispersed catalytic metal particles, and a fuel cell having such a membrane-electrode assembly incorporated is considered to have a merit that during the power generation, hydrogen peroxide or peroxide radicals tend to be hardly formed, and deterioration in the performance tends to be less even when the power generation is continued for a long period of time.

Further, in a case where the catalyst is subjected to heat treatment in order to remove acidic functional groups adsorbed on the surface of the carbon support of the catalyst, if the temperature for the heat treatment is too high, the catalytic metal particles will undergo grain growth, whereby the catalytic activities will be low, and the output of the obtainable fuel cell will be low. Therefore, in a case where acidic functional groups on the surface of the carbon support are to be reduced by heat treatment of the catalyst, the temperature for the heat treatment is adjusted preferably from 100 to 800° C., particularly preferably from 150 to 500° C. Further, for example, in a case where an electrode is bonded to a membrane by hot pressing, heat treatment at 130° C. for a few minutes may be carried out. However, no substantial change will be observed in the amount of functional groups at the surface of the catalyst by heat treatment of such a level.

Further, the average particle size of the catalyst metal particles contained in the catalyst layers of the membrane-electrode assembly is preferably from 1 to 60 nm. Particularly, with a view to preventing grain growth due to e.g. sintering of the metal particles, the average particle size is preferably from 10 to 60 nm, particularly preferably from 20 to 50 nm. On the other hand, with a view to finely dispersing the metal particles thereby to obtain high catalytic activities, the average particle size is preferably from 1 to 20 nm, particularly preferably from 2 to 10 nm.

BEST MODE FOR CARRYING OUT THE INVENTION

With respect to an embodiment of the membrane-electrode assembly for a polymer electrolyte fuel cell obtainable by the present invention, its cross-sectional view is shown in FIG. 1 together with separators sandwiching the assembly. Now, the membrane-electrode assembly 7 will be described with reference to FIG. 1. The membrane-electrode assembly 7 comprises a polymer electrolyte membrane 1, an anode catalyst layer 2 and a cathode catalyst layer 3 adhered to the membrane surfaces of this electrolyte membrane 1, gas diffusion layers 4 and 4' adhered to such respective catalyst layers, and gas sealing members 6. The gas diffusion layers 4 and 4' are usually made of a porous electroconductive material, and they may not be provided, but are usually preferably provided, since they promote diffusion of gas to the catalyst layers and also have a function as current collectors. In this specification, in a case where the membrane-electrode assembly 7 has gas diffusion layers 4 and 4', the combinations of the gas diffusion layers 4 and 4' and the catalyst layers 2 and 3, are referred to as electrodes.

Outside of the membrane-electrode assembly 7, separators 5 having grooves formed to constitute gas flow paths 5a, are disposed. On the anode side, via the grooves of the separator, hydrogen gas obtainable by modifying a fuel such as methanol or natural gas, is supplied, and for such modification, a temperature of from about 250 to 300° C. is usually required. If exhaust heat at that time is utilized, it is possible to humidify the hydrogen gas at a high temperature and thereby to supply hydrogen gas having high dew point.

Accordingly, to the anode side rather than to the cathode side, a high humidity gas sufficiently humidified can be systematically more readily supplied.

The polymer electrolyte membrane 1 is preferably made of a perfluorocarbon polymer having sulfonic acid groups and plays a role of selectively permeating protons formed in the anode catalyst layer 2 to a cathode catalyst layer 3 in the thickness direction. Further, the polymer electrolyte membrane 1 also has a function as a separating membrane to prevent the hydrogen supplied to the anode and the oxygen supplied to the cathode from mixing. Such a perfluorocarbon polymer having sulfonic acid groups is preferably a copolymer containing polymerized units based on a perfluorovinyl compound represented by $CF_2=CF-(OCF_2CFX)_m-O_p-(CF_2)_n-SO_3H$ (wherein m is an integer of from 0 to 3, n is an integer of from 1 to 12, p is 0 or 1, and X is a fluorine atom or a trifluoromethyl group) and polymerized units based on tetrafluoroethylene.

Compounds represented by the following formulae (i) to (iii) may be mentioned as preferred examples of the above fluorovinyl compound. In the following formulae, q is an integer of from 1 to 8, r is an integer of from 1 to 8, and t is an integer of from 1 to 3.

$$CF_2=CFO(CF_2)_qSO_3H \quad (i)$$

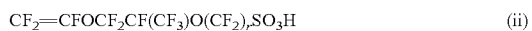

$$CF_2=CFOCF_2CF(CF_3)O(CF_2)_rSO_3H \quad (ii)$$

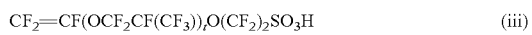

$$CF_2=CF(OCF_2CF(CF_3))_tO(CF_2)_2SO_3H \quad (iii)$$

The anode catalyst layer 2 and the cathode catalyst layer 3 are disposed between the after-mentioned gas diffusion layers 4 and 4' and the polymer electrolyte membrane 1. The anode catalyst layer 2 is constituted to comprise a catalyst having an alloy of platinum and ruthenium dispersed on a carbon support, and an ion exchange polymer. The cathode catalyst layer 3 is constituted to comprise a catalyst having platinum or a platinum alloy dispersed on a carbon support, and an ion exchange polymer. The anode catalyst layer 2 and the cathode catalyst layer 3 are formed by preparing coating liquids for forming catalyst layers comprising a catalyst, an ion exchange polymer and a dispersing medium, applying the coating fluids to the gas diffusion layers 4 and 4' or to the polymer electrolyte membrane 1, followed by drying. In such a case, the gas diffusion layers 4 and 4' or the polymer electrolyte membrane 1 functions as a substrate to be coated with the coating fluids. Otherwise, the above coating fluids may be applied to separately prepared substrates, followed by drying to form catalyst layers, which are then laminated and hot pressed to the polymer electrolyte membrane 1, so that they are transferred to the polymer electrolyte membrane 1.

Here, as the separately prepared substrates to be coated with the coating fluids for forming the catalyst layers, any film may be preferably employed so long as it is stable against the dispersing medium contained in the coating fluids for forming the catalyst layers. For example, a sheet of polypropylene, polyethylene terephthalate, ethylene/tetrafluoroethylene copolymer or polytetrafluoroethylene, may, for example, be mentioned.

In the present invention, a catalyst is used wherein the density of the total amount of OH groups and CO groups present at the surface of the catalyst is at most $1.6 \times 10^{-3}$ (mmol/m$^2$). The amount of OH groups and CO groups in commercially available catalysts is usually from about 2.2 to $6.0 \times 10^{-3}$ (mmol/m$^2$). Accordingly, in the process for preparing the catalyst layers, it is necessary to carry out surface treatment of the catalyst to reduce the amount of acidic functional groups at the surface of the catalyst. In the present invention, such surface treatment may be carried out before preparing the coating fluid for forming the catalyst layer, or may be carried out after forming a catalyst layer by the coating fluid for forming the catalyst layer, as a treatment against the catalyst layer. Otherwise, it may be carried out after preparing the membrane-electrode assembly outside the catalyst layer, as a treatment against the membrane-electrode assembly. Or, after applying surface treatment to a carbon support, platinum or a platinum alloy may be dispersed on the carbon support.

Such surface treatment is preferably carried out so that the total molar amount of OH groups and CO groups at the surface of the catalyst or the carbon support is reduced to a level of at most one half of that before the surface treatment. Further preferably, it is reduced to a level of at most one third.

The method for such surface treatment may, for example, be heat treatment in an inert gas, alkoxylation treatment with an alcohol, reduction treatment with hydrogen gas, treatment with a reducing reagent such as lithium aluminum hydride or sodium boron hydride, treatment with a silane coupling agent or treatment with fluorine gas. By such treatment, acidic functional groups such as carboxyl groups or phenolic hydroxyl groups adsorbed on the surface of the carbon support of the catalyst can be removed or can be converted to other functional groups.

It is considered that in the present invention, the catalytic activities to the reaction to form hydrogen peroxide from hydrogen and oxygen are low, since the amount of acidic functional groups per unit area of the surface of the catalyst is small. Accordingly, it is considered that when the membrane-electrode assembly obtainable by the process of the present invention is assembled in a fuel cell, hydrogen peroxide or peroxide radicals tend to be hardly formed during the power generation, and deterioration in the performance will be reduced even when the power generation is carried out for a long period of time. From such a viewpoint, the smaller density of total functional groups of OH groups and CO groups at the surface of the catalyst should be better, more preferably from 0.3 to $1.5 \times 10^{-3}$ (mmol/m$^2$) If the density is less than $0.3 \times 10^{-3}$ (mmol/m$^2$), the adhesion between the ion exchange polymer and the catalyst is likely to be inadequate.

Here, the density of OH groups and CO groups in the present invention is one obtained by dividing the amount of functional groups (mmol/g) at the surface of the catalyst obtained by a titration method (H. P. Boehm, Angew Chem. 78, 617 (1966)) by the specific surface area (m$^2$/g) of the catalyst obtained by BET method. The method in the above reference is one by an acid/base titration, wherein two samples (catalyst powders) each weighing 0.5 g, are prepared, and 50 ml of a 0.5N Na$_2$CO$_3$ solution and 50 ml of a 0.5N NaOH solution are added thereto, respectively, and the mixtures are left to stand still at room temperature for 24 hours. After being thus reacted, the mixtures are filtered, and the filtrates are subjected to back titration with 0.05N hydrochloric acid using methyl orange as an indicator to obtain the amounts of the functional groups of OH groups and CO groups, respectively. Here, CO groups to be measured by means of the NaOH solution are carboxyl groups and lactone groups.

Further, for comparison of the amounts of the functional groups of OH groups and CO groups of the catalyst or the carbon support as between before and after the surface treatment, measurements may be carried out with respect to the respective powders before the treatment and after the treatment by means of the mass spectra, to relatively compare them.

In the catalyst in the present invention, the mass ratio of the catalytic metal particles to the carbon support is preferably from 2:8 to 7:3, particularly preferably from 4:6 to 6:4. Within such a range, the thickness of the catalyst layer can be made thin, and it is possible to increase the gas dispersibility to obtain excellent output characteristics. If the content of the catalytic metal in the catalyst is small, the amount of the catalytic metal required for the reaction is likely to be inadequate, and if the content of the catalytic metal is too large, aggregation of the catalytic metal particles one another is likely to take place on the carbon support, whereby the performance is likely to rather deteriorate.

As the carbon material to be used as a support for the catalyst in the present invention, various carbon materials may preferably be used, such as carbon black having fine pores, activated carbon, carbon nanotubes or carbon nanohorns. In polymer electrolyte fuel cells, carbon black is usually employed in many cases. As such carbon black, channel black, furnace black, thermal black or acetylene black may, for example, be mentioned. Further, as the activated carbon, various activated carbon materials may be used which are obtainable by subjecting various materials containing carbon atoms to carbonization or activation treatment.

In the present invention, a coating fluid for forming a catalyst layer is prepared by mixing preferably a catalyst having its surface treated to reduce the amount of acidic functional groups such as carboxyl groups, lactone groups or phenolic hydroxyl groups, an ion exchange polymer and a dispersion medium. And, as mentioned above, a catalyst layer is formed by using this coating fluid. The ion exchange polymer to be used here is preferably a perfluorocarbon polymer having sulfonic acid groups from the viewpoint of the durability. As such a perfluorocarbon polymer, the same one as the polymer constituting the polymer electrolyte membrane 1 is preferably used, and it may be the same or different from the polymer constituting the polymer electrolyte membrane 1.

As the method for applying the above coating fluid for forming a catalyst layer, a method of using an applicator, a bar coater or a die coater, a screen printing method or a gravure printing method may, for example, be employed. Further, it is possible to add a water repellent, a pore-forming agent, a thickener, a diluting solvent, etc. to the coating fluid for forming a catalyst layer, as the case requires, in order to increase the removability of water formed by the reaction in the electrode, to maintain the dimensional stability of the catalyst layer itself, to improve over the coating irregularities during the application, or to increase e.g. the coating stability.

In a catalytic metal dispersed carbon support, a plane layer of a polycyclic aromatic compound constitutes a crystallite, and such crystallites are gathered to form primary particles. On the edge of such plane layers, various functional groups such as carboxyl groups, lactone groups or phenolic hydroxyl groups, are formed. In order to prevent formation of radicals during the power generation, it is necessary to reduce the amount of acidic functional groups such as carboxyl groups or phenolic hydroxyl groups, per unit area at the catalyst surface. If a step of reducing the amount of acidic groups at the catalyst surface, is not carried out, active sites will remain at the catalyst surface, and peroxide radicals, etc. are likely to be formed during the power generation, whereby it will be impossible to obtain a constant output over a long period of time.

The gas diffusion layers 4 and 4' are usually made of an electroconductive porous sheet such as carbon paper, carbon cloth or carbon felt. Such a gas diffusion layer 4 or 4' is interposed between a catalyst layer and a separator 5. For such gas diffusion layers 4 and 4', a material having water repellent treatment with a fluororesin applied to carbon paper, carbon cloth or carbon felt, may, for example, be preferably employed.

In the polymer electrolyte fuel cell provided with the membrane-electrode assembly according to the present invention, a gas containing oxygen is supplied to the cathode, and a gas containing hydrogen is supplied to the anode. Specifically, a separator having grooves formed to constitute gas flow paths is disposed outside of each electrode of the membrane-electrode assembly, and the gas is permitted to flow through the gas flow paths thereby to supply the gas as a fuel to the membrane-electrode assembly to generate the power. The separators may be those made of metal or carbon or those made of a material having graphite and a resin mixed, and various electroconductive materials may be widely employed.

Now, the present invention will be described in further detail with reference to Examples and Comparative Example, but it should be understood that the present invention is by no means thereby restricted.

EXAMPLE 1

Present Invention 2.5 g of a catalyst having platinum dispersed on carbon support (specific surface area: 800 $m^2/g$) in an amount of 50% based on the total mass of the catalyst (manufactured by N.E. Chemcat Corporation, hereinafter referred to as catalyst 1) was subjected to heat treatment at 800° C. for one hour in an argon atmosphere.

Then, 10.2 g of distilled water was added to 2.0 g of this heat-treated catalyst powder. Further, to this slurry, 11.2 g of a liquid having a $CF_2$=$CF_2/CF_2$=$CFOCF_2CF(CF_3)O(CF_2)_2SO_3H$ copolymer (ion exchange capacity: 1.1 meq/g dry polymer, hereinafter referred to as copolymer A) dispersed in ethanol and having a solid content concentration of 9 mass % (hereinafter referred to as an ethanol dispersion of copolymer A) was added. This slurry was homogenized by using a homogenizer (Polytron, tradename, manufactured by Kinematica Company) to obtain a coating fluid (a) for forming a catalyst layer.

This coating fluid a was applied by a bar coater on a substrate film made of polypropylene and then dried for 30 minutes in a drier at 80° C. to obtain a catalyst layer (a). Further, the apparent amount of platinum per unit area contained in the catalyst layer (a) was calculated by measuring the mass of the substrate film before forming the catalyst layer (a) and the mass of the substrate film after forming the catalyst layer a, and it was found to be 0.5 $mg/cm^2$.

Then, using, as a polymer electrolyte membrane, an ion exchange membrane made of perfluorocarbon polymer having sulfonic acid groups and having a thickness of 30 μm (Flemion, tradename, manufactured by Asahi Glass Company, Limited, ion exchange capacity: 1.1 meq/g dry polymer), the catalyst layer (a) formed on a substrate film was disposed on each side of this membrane and tranferred by hot press method, to form an anode catalyst layer and a cathode catalyst layer thereby to obtain a membrane-catalyst layer assembly comprising the polymer electrolyte membrane and catalyst layers and having an electrode area of 25 cm².

The obtained membrane-catalyst layer assembly was interposed between two gas diffusion layers 2 made of carbon cloth having a thickness of 350 μm to prepare a membrane-electrode assembly. It was assembled into a cell for power generation, and evaluation of the polymer electrolyte fuel cell at a current density of 0.2 A/cm² at a cell temperature of 70° C., was carried out by supplying hydrogen (utilization ratio: 70%)/air (utilization ratio: 40%) under atmospheric pressure. On the anode side, the dew point was set to be 70° C., and on the cathode side, the dew point was set to be 50° C., and hydrogen and air were respectively humidified and supplied into the cell, whereupon the cell voltage at the initial stage of operation was measured. The results are shown in Table 1. Further, the relation between the elapsed time after the initiation of the operation and the cell voltage (durability evaluation) was measured, and the results are as shown in Table 1.

Then, under the same conditions as above except that the dew point on the cathode side was changed to 70° C., the initial cell voltage of the solid electrolyte fuel cell was measured. The results are shown in Table 2. Further, the relation between the elapsed time after the initiation of the operation and the cell voltage was measured, and the results are as shown in Table 2.

EXAMPLE 2

Comparative Example

A coating fluid (b) for forming a catalyst layer was prepared in the same manner as in Example 1 except that the same catalyst 1 as in Example 1 was used as it is without being subjected to heat treatment. A catalyst layer (b) was prepared in the same manner as in Example 1 by using the coating fluid (b) instead of the coating fluid (a). The amount of platinum per unit area contained in the catalyst layer (b) was measured in the same manner as in Example 1 and was found to be 0.5 mg/cm². Then, a membrane-catalyst layer assembly having an electrode area of 25 cm² was prepared in the same manner as in Example 1 except that both anode catalyst layer and cathode catalyst layer were constituted by the catalyst layer (b).

Using this membrane-catalyst layer assembly, a membrane-electrode assembly was prepared in the same manner as in Example 1, and the initial cell voltages were measured by operation under the two conditions different in the dew point on the cathode side in the same manner as in Example 1. The results are shown in Tables 1 and 2, respectively. Further, evaluation of the durability was carried out in the same manner as in Example 1, and the results thereby obtained are shown in Tables 1 and 2, respectively.

EXAMPLE 3

Present Invention 5.0 g of the same catalyst 1 as in Example 1 was uniformly placed at the bottom of a 500 ml three necked separable flask equipped with a reflux condenser. The air in the flask was replaced with nitrogen gas, and then, 100 g of anhydrous ethanol was slowly added, whereupon ethoxylation treatment of acidic functional groups at the surface of the catalyst was carried out for 4 hours while ethanol was refluxed under heating. After completion of the treatment, the catalyst was separated by filtration and dried at 120° C. in a nitrogen atmosphere to take out a catalyst powder. To 2.0 g of the catalyst powder subjected to such ethanol treatment, 10.2 g of distilled water was added, and further, 11.2 g of a dispersion of copolymer A in ethanol was added. This mixed liquid was homogenized by means of a homogenizer (Polytron, tradename, manufactured by Kinematica Company) to obtain a coating fluid (c) for forming a catalyst layer.

A catalyst layer (c) was prepared in the same manner as in Example 1 except that the coating fluid (c) was used instead of the coating fluid (a). The amount of platinum per unit area contained in the catalyst layer (c) was 0.55 mg/cm². Then, a membrane-catalyst layer assembly having an electrode area of 25 cm² was prepared in the same manner as in Example 1 except that the catalyst layer (c) was used instead of the catalyst layer (a) as the catalyst layer on the anode side and as the catalyst layer on the cathode side.

Using this membrane-catalyst layer assembly, a membrane-electrode assembly was prepared in the same manner as in Example 1, and the initial cell voltages were measured by operation under two conditions different in the dew point on the cathode side in the same manner as in Example 1. The results are shown in Tables 1 and 2, respectively. Further, evaluation of the durability was carried out in the same manner as in Example 1, and the obtained results are shown in Tables 1 and 2, respectively.

EXAMPLE 4

Present Invention

A coating fluid (d) for forming a catalyst layer was prepared by the same treatment as in Example 1 except that the heat treatment temperature of the same catalyst 1 as in Example 1 was 400° C. This coating fluid (d) was applied by a bar coater on a substrate film made of polyethylene and dried for 30 minutes in a drier at 80° C. to obtain a catalyst layer (d). Here, the amount of platinum per unit area contained in the catalyst layer (f) was 0.5 mg/cm². Then, a membrane-electrode assembly having an electrode area of 25 cm² was prepared in the same manner as in Example 1 except that both the anode catalyst layer and the cathode catalyst layer were constituted by the catalyst layer (d).

Using this membrane-catalyst layer assembly, a membrane-electrode assembly was prepared in the same manner as in Example 1, and the initial cell voltages were measured by operation under two conditions different in the dew point on the cathode side in the same manner as in Example 1. The results are shown in Tables 1 and 2, respectively. Further, evaluation of the durability was carried out in the same manner as in Example 1, and the obtained results are shown in Tables 1 and 2, respectively.

EXAMPLE 5

Present Invention 5.0 g of the same catalyst 1 as in Example 1 was uniformly placed at the bottom of a porcelain container and put in an oven. After replacing the air in the oven with nitrogen gas, the temperature was set to be 250° C., and a mixed gas of hydrogen/nitrogen=1/9 was fed into the oven at a rate of 10 ml/min. The inner gas of the oven was again replaced with nitrogen and returned to room temperature, whereupon the catalyst powder was taken out to obtain a catalyst powder having hydrogen reduction treatment applied. To 2.0 g of this catalyst powder, 10.2 g of distilled water was added, and further, 11.2 g of a dispersion of copolymer A in ethanol was added. The obtained mixed liquid was homogenized by means of a homogenizer (Polytron, tradename, manufactured by Kinematica Company) to obtain a coating fluid (e) for forming a catalyst layer.

A catalyst layer (e) having an amount of platinum per unit area of 0.55 mg/cm$^2$ was prepared in the same manner as in Example 1 except that the coating fluid (e) was used instead of the coating fluid (a). Then, a membrane-catalyst layer assembly having an electrode area of 25 cm$^2$ was prepared in the same manner as in Example 1 except that the catalyst layer (e) was used instead of the catalyst layer (a) as the catalyst layer on the anode side and as the catalyst layer on the cathode side.

Using this membrane-catalyst layer assembly, a membrane-electrode assembly was prepared in the same manner as in Example 1, and the measurement of the initial cell voltages by operation under two conditions different in the dew point on the cathode side and evaluation of the durability, were carried out in the same manner as in Example 1, whereby the results are as shown in Tables 1 and 2, respectively.

Evaluation with Respect to the Amount of Surface Functional Groups of Catalyst Powder In order to ascertain the change in the amount of surface functional groups by the treatment of a catalyst in the present invention, with respect to the catalyst after the heat treatment in Example 1 and the catalyst without heat treatment in Example 2, the amount N (mmol/g) of functional groups at the surface of the catalyst was obtained by a titration method (H. P. Boehm, Angew Chem. 78, 617 (1966)), and the specific surface area S (m$^2$/g) of the catalyst was obtained by BET method, whereupon the density d (mmol/m$^2$) of the functional groups was calculated. The results are shown in Table 3.

In the same manner, also with respect to the catalyst treated with anhydrous ethanol in Example 3 and the catalyst heat treated in Example 4, the density of functional groups can be obtained in the same manner by titrating the amount of acidic functional groups and measuring the BET specific surface area. The results are shown in Table 3. Further, if the same measurement is carried out with respect to the catalyst subjected to hydrogen reduction treatment in Example 5, the results would be as shown in Table 3.

Further, in each Example, after preparing a membrane-catalyst layer assembly, the amount of surface functional groups of the catalyst powder contained in the catalyst layer, is measured. The measurement can be carried out in the same manner as described above. Further, in a case of measuring functional groups with respect to the catalyst layer, the amount of OH groups based on the polymer having sulfonic acid groups, contained in the catalyst layer, will also be measured. The density of functional groups based on sulfonic acid groups can be calculated from the ion exchange capacity of the polymer. For example, the polymer (a) has an ion exchange capacity of 1.1 meq/g dry polymer, and thus, it contains 1.1 mmol of sulfonic acid groups per 1 g, and the corresponding amount may be deducted from the practically measured amount.

Further, in a case where functional groups at the surface of a catalyst are alkoxylated with alcohol, a quantitative analysis of the surface acidity is carried out by automatic titration curve measurement. Specifically, 0.1 g of a sample is dispersed in 15 ml of a 0.5 mol NaCl aqueous solution, and a titration curve by a NaOH solution till pH 7, is obtained, whereby the alkoxy coverage of the treated sample against the original sample and the amount of functional groups remaining without being alkoxilated, can be obtained.

The amount of OH groups and CO groups of a catalyst contained in the catalyst layer to be measured as described above, is confirmed to have no significant difference from the results in Table 1.

Change in the Amount of Surface Functional Groups Between Before and after the Surface Treatment of Catalyst In order to ascertain the change in the amount of surface functional groups by treatment of a catalyst in the present invention, with respect to the catalyst after the heat treatment in Example 1 and the catalyst without heat treatment in Example 2, the mass spectrum was measured by an infrared heating method. As an infrared heating furnace, Mila 3000 manufactured by ULVAC-RIKO, Inc. was used, and as a mass spectrometer, JMS-AMII150 manufactured by JEOL Ltd. was used. A peak area attributable to OH groups and a peak area attributable to CO groups were respectively calculated, and on the basis of the respective peak areas of the catalyst without heat treatment (Example 2) being 100, the relative value of the catalyst heat treated in Example 1 was calculated. The results are shown in Table 4.

In the same manner, the mass spectra were measured also with respect to the catalyst treated with anhydrous ethanol in Example 3 and the catalyst heat treated in Example 4, and the relative values against the catalyst without treatment in Example 2, were calculated. The results are shown in Table 4. Further, if the same measurement is carried out also with respect to the catalyst subjected to hydrogen reduction treatment in Example 5, the results would be as shown in Table 4.

Measurement of the Average Particle Size of Catalytic Metal

With respect to the catalyst having no heat treatment applied in Example 2, the average particle size of catalytic metal was calculated by means of a Sheller formula from the half value width of the peak in the (1,1,1) face of platinum by an X-ray diffraction method and found to be 3 nm. If the same measurements are carried out with respect to the catalyst having heat treatment applied in Example 1, the catalyst having anhydrous ethanol treatment applied in Example 3, the catalyst having heat treatment applied in Example 4 and the catalyst having hydrogen reduction treatment applied in Example 5, the average particle sizes of catalytic metal would be as shown in Table 4.

TABLE 1

| | Initial output voltage (V) | Durability/output voltage (V) | |
| --- | --- | --- | --- |
| | | After 500 hrs | After 200 hrs |
| Ex. 1 | 0.71 | 0.71 | 0.70 |
| Ex. 2 | 0.72 | 0.63 | 0.48 |
| Ex. 3 | 0.73 | 0.71 | 0.69 |
| Ex. 4 | 0.72 | 0.70 | 0.68 |
| Ex. 5 | 0.73 | 0.71 | 0.70 |

TABLE 2

| | Initial output voltage (V) | Durability/output voltage (V) | |
| --- | --- | --- | --- |
| | | After 500 hrs | After 200 hrs |
| Ex. 1 | 0.73 | 0.73 | 0.71 |
| Ex. 2 | 0.74 | 0.65 | 0.51 |

TABLE 2-continued

|  | Initial output voltage (V) | Durability/output voltage (V) | |
|---|---|---|---|
|  |  | After 500 hrs | After 200 hrs |
| Ex. 3 | 0.75 | 0.74 | 0.73 |
| Ex. 4 | 0.74 | 0.72 | 0.70 |
| Ex. 5 | 0.75 | 0.74 | 0.73 |

TABLE 3

|  | Treatment method | Amount of OH groups (mmol/g) | Amount of CO groups (mmol/g) | Total amount of acidic functional groups (mmol/g) | BET specific surface area (m$^2$/g) | Density of functional groups (mmol/m$^2$) × 1000 |
|---|---|---|---|---|---|---|
| Ex. 1 | Heat treatment | 0.14 | 0.04 | 0.18 | 316 | 0.57 |
| Ex. 2 | No treatment | 0.56 | 0.14 | 0.70 | 308 | 2.27 |
| Ex. 3 | Anhydrous ethanol | 0.20 | 0.04 | 0.24 | 300 | 0.80 |
| Ex. 4 | Heat treatment | 0.27 | 0.07 | 0.34 | 333 | 1.02 |
| Ex. 5 | Hydrogen reduction | 0.11 | 0.03 | 0.14 | 320 | 0.44 |

TABLE 4

|  | Treatment method | OH groups | CO groups | Average particle size (nm) |
|---|---|---|---|---|
| Ex. 1 | Heat treatment | 25 | 22 | 14 |
| Ex. 2 | No treatment | 100 | 100 | 3 |
| Ex. 3 | Anhydrous ethanol treatment | 30 | 25 | 3 |
| Ex. 4 | Heat treatment | 45 | 43 | 9 |
| Ex. 5 | Hydrogen reduction | 20 | 18 | 7 |

INDUSTRIAL APPLICABILITY

According to the process of the present invention, the density of acidic functional groups such as carbonyl groups or phenolic hydroxyl groups at the surface of the carbon support of the catalyst is reduced, whereby the catalyst in the catalyst layer will be coated further sufficiently with an ion exchange polymer. At the same time, it is possible to obtain a membrane-electrode assembly having catalyst layers whereby radicals tend to be hardly formed. Accordingly, it is possible to present a membrane-electrode assembly for a polymer electrolyte fuel cell which is stable even when power generation is carried out for a long period of time.

Figure 1:
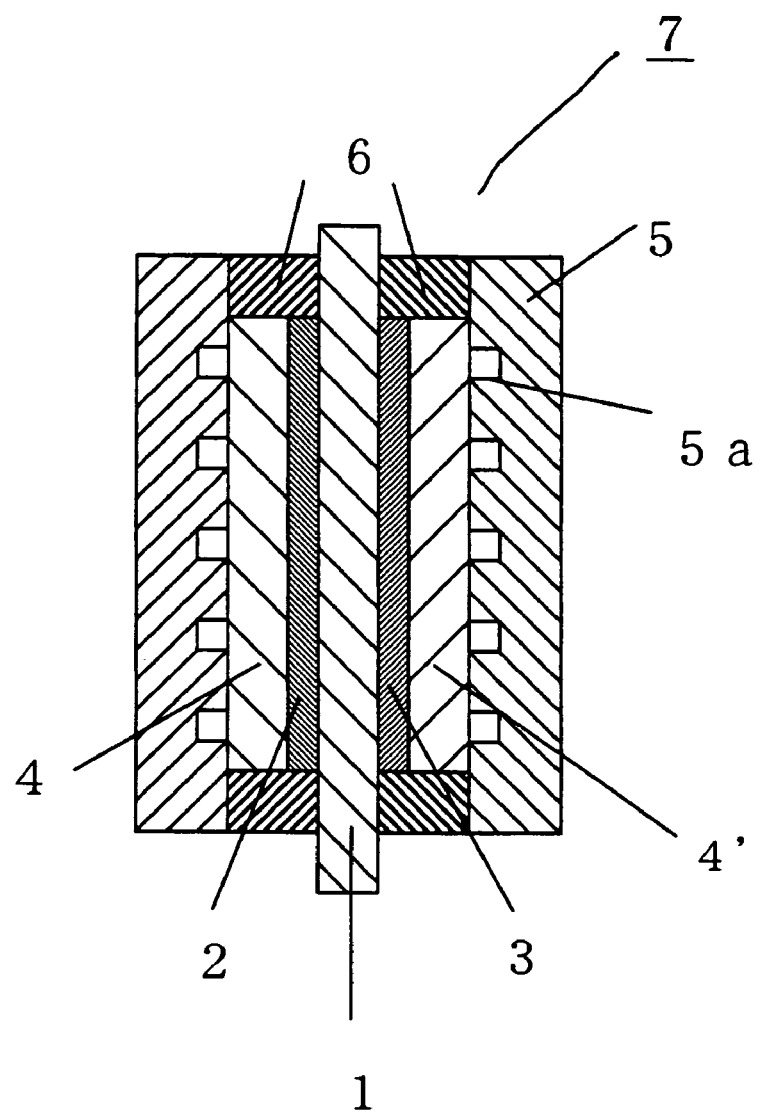
FIG. 1 is a cross-sectional view illustrating an embodiment of the membrane-electrode assembly for a polymer electrolyte fuel cell of the present invention.

The entire disclosures of Japanese Patent Application No. 2003-179783 filed on Jun. 24, 2003 and Japanese Patent Application No. 2003-301226 filed on Aug. 26, 2003 including specifications, claims, drawings and summaries are incorporated herein by reference in their entireties.

What is claimed is:

1. A process for producing a membrane-electrode assembly for a polymer electrolyte fuel cell comprising an anode and a cathode each having a catalyst layer, and an ion exchange membrane disposed between the anode and the cathode, wherein a step of producing at least one of the catalyst layer of the anode and the catalyst layer of the cathode, comprises a step of preparing a coating fluid containing an ion exchange polymer and a catalyst having catalytic metal particles dispersed on a carbon support, and a step of forming a catalyst layer by applying the coating fluid on a substrate, wherein the above coating fluid is prepared by using, as the above catalyst, a catalyst wherein the density of total functional groups of OH groups and CO groups at the surface is from 0.3 to $1.5 \times 10^{-3}$ (mmol/m$^2$), as obtained from the BET specific surface area and the total molar amount of OH groups and CO groups at the surface obtained by a titration method.

2. A process for producing a membrane-electrode assembly for a polymer electrolyte fuel cell comprising an anode and a cathode each having a catalyst layer, and an ion exchange membrane disposed between the anode and the cathode, wherein in a step of producing at least one of the catalyst layer of the anode and the catalyst layer of the cathode, after a step of preparing a coating fluid containing an ion exchange polymer and a catalyst having catalytic metal particles dispersed on a carbon support and a step of forming a catalyst layer by applying the coating fluid on a substrate, surface treatment to reduce the amount of OH groups and CO groups at the surface of the catalyst, is carried out, so that the density of total functional groups of OH groups and CO groups at the surface be brought to from 0.3 to $1.5 \times 10^{-3}$ (mmol/m$^2$), as obtained from the BET specific surface area and the total molar amount of OH groups and CO groups at the surface of the catalyst obtained by a titration method.

3. A process for producing a membrane-electrode assembly for a polymer electrolyte fuel cell according to claim 2, wherein by the surface treatment of the catalyst, the total molar amount of OH groups and CO groups at the surface of the catalyst is brought to at most one half of that before the treatment.

4. The process for producing a membrane-electrode assembly for a polymer electrolyte fuel cell according to claim 1, wherein the average particle size of the catalytic metal particles is from 1 to 60 nm.

5. The process for producing a membrane-electrode assembly for a polymer electrolyte fuel cell according to claim 1, wherein the catalyst powder is thermally treated at a temperature of from 100 to 800° C. in an inert gas atmosphere to bring the density of the functional groups from 0.3 to $1.5 \times 10^{-3}$ (mmol/m$^2$).

6. The process for producing a membrane-electrode assembly for a polymer electrolyte fuel cell according to claim 1, wherein the mass ratio of the catalytic metal particles to the carbon support, in the catalyst, is from 2:8 to 7:3.

7. The process for producing a membrane-electrode assembly for a polymer electrolyte fuel cell according to claim 1, wherein the carbon support is at least one member selected from the group consisting of carbon black, activated carbon, carbon nanotubes and carbon nanohoms.

8. The process for producing a membrane-electrode assembly for a polymer electrolyte fuel cell according to claim 1, wherein the above ion exchange polymer is a copolymer comprising repeating units based on a perfluorovinyl compound represented by $CF_2=CF-(OCF_2CFX)m-O_p-(CF_2)_n-SO_3H$ (wherein m is an integer of from 0 to 3, n is an integer of from 1 to 12, p is 0 or 1, and X is a fluorine atom or a trifluoromethyl group) and repeating units based on tetrafluoroethylene.

9. A membrane-electrode assembly for a polymer electrolyte fuel cell comprising an anode and a cathode each having a catalyst layer, and an ion exchange membrane disposed between the anode and the cathode, wherein at least one of the catalyst layer of the anode and the catalyst layer of the cathode contains an ion exchange polymer and a catalyst having catalytic metal particles dispersed on a carbon support, and the above catalyst is such that the density of total functional groups of OH groups and CO groups at the surface is from 0.3 to $1.5 \times 10^{-3}$ (mmol/m$^2$) as obtained from the BET specific surface area and the total molar amount of OH groups and CO groups at the surface obtained by a titration method.

10. The membrane-electrode assembly for a polymer electrolyte fuel cell according to claim 9, wherein the average particle size of the catalytic metal particles is from 1 to 60 nm.

11. The process for producing a membrane-electrode assembly for a polymer electrolyte fuel cell according to claim 2, wherein the average particle size of the catalytic metal particles is from 1 to 60 nm.

12. The process for producing a membrane-electrode assembly for a polymer electrolyte fuel cell according to claim 3, wherein the average particle size of the catalytic metal particles is from 1 to 60 nm.

13. The process for producing a membrane-electrode assembly for a polymer electrolyte fuel cell according to claim 2, wherein the catalyst powder is thermally treated at a temperature of from 100 to 800° C. in an inert gas atmosphere to bring the density of the functional groups to from 0.3 to $1.5 \times 10^{-3}$ (mmol/m2).

14. The process for producing a membrane-electrode assembly for a polymer electrolyte fuel cell according to claim 2, wherein the mass ratio of the catalytic metal particles to the carbon support, in the catalyst, is from 2:8 to 7:3.

15. The process for producing a membrane-electrode assembly for a polymer electrolyte fuel cell according to claim 2, wherein the carbon support is at least one member selected from the group consisting of carbon black, activated carbon, carbon nanotubes and carbon nanohoms.

16. The process for producing a membrane-electrode assembly for a polymer electrolyte fuel cell according to claim 2, wherein the above ion exchange polymer is a copolymer comprising repeating units based on a perfluorovinyl compound represented by $CF_2=CF-(OCF_2CFX)m-O_p-(CF_2)_n-SO_3H$ (wherein m is an integer of from 0 to 3, n is an integer of from 1 to 12, p is 0 or 1, and X is a fluorine atom or a trifluoromethyl group) and repeating units based on tetrafluoroethylene.

* * * * *